(12) United States Patent
Wezowski et al.

(10) Patent No.: US 11,853,950 B2
(45) Date of Patent: Dec. 26, 2023

(54) MULTIMODAL DATA FRAMEWORK FOR DIGITAL SYSTEM REPRESENTATION

(71) Applicant: SAP SE, Walldorf (DE)

(72) Inventors: Martin Wezowski, Berlin (DE); Hans-Martin Will, Marina Del Ray, CA (US); Rohit Jalagadugula, Bengaluru (IN); Kavitha Krishnan, Bangalore (IN); Sai Hareesh Anamandra, Bangalore (IN); Vinay George Roy, Kozhikode (IN); Parthasarathy Menon, Kozhikode (IN); Alexander Schaefer, Sunnyvale, CA (US)

(73) Assignee: SAP SE, Walldorf (DE)

( * ) Notice: Subject to any disclaimer, the term of this patent is extended or adjusted under 35 U.S.C. 154(b) by 24 days.

(21) Appl. No.: 17/486,126

(22) Filed: Sep. 27, 2021

(65) Prior Publication Data

US 2023/0096720 A1 Mar. 30, 2023

(51) Int. Cl.
*G06Q 10/0639* (2023.01)
*G06Q 10/067* (2023.01)
(Continued)

(52) U.S. Cl.
CPC ..... *G06Q 10/06398* (2013.01); *G06Q 10/067* (2013.01); *G06Q 10/0633* (2013.01); *H04L 67/535* (2022.05)

(58) Field of Classification Search
CPC ......... G06Q 10/06398; G06Q 10/0633; G06Q 10/067; H04L 67/535
(Continued)

(56) References Cited

U.S. PATENT DOCUMENTS

2014/0053125 A1* 2/2014 DeLuca ............... G06F 8/71
717/101
2018/0081496 A1* 3/2018 Bhardwaj ............ G06F 3/011
(Continued)

OTHER PUBLICATIONS

Gartner, 2019: Gartner Says AI Augmentation Will Create $2.9 Trillion of Business Value in 2021. (Available at https://www.gartner.com/en/newsroom/press-releases/2019-08-05-gartner-says-ai-augmentation-will-create-2point9-trillion-of-business-value-in-2021), 2 pages.
(Continued)

*Primary Examiner* — Charles Guiliano
(74) *Attorney, Agent, or Firm* — Mintz Levin Cohn Ferris Glovsky and Popeo, P.C.

(57) ABSTRACT

A method may include collecting data from a variety of data sources associated with a user. The data sources may include personal data sources, corporate data sources, and public data source. The data collected from the variety of data sources may be enriched through categorization and aggregation. For example, browser history may be categorized based on types of website and aggregated to reflect the quantity of interactions with each category of website. A multi-dimensional digital profile may be generated based on the enriched data. For instance, the digital profile may include a social, emotional, spiritual, environmental, occupational, intellectual, and physical dimension. One or more recommendation corresponding to one or more of a burnout prediction, wellness recommendation, learning plan, skill gap, and personality type may be generated based on the digital profile. Related systems and computer program products are also provided.

16 Claims, 12 Drawing Sheets

(51) Int. Cl.
*G06Q 10/0633* (2023.01)
*H04L 67/50* (2022.01)

(58) Field of Classification Search
USPC .......................................................... 705/7.42
See application file for complete search history.

(56) References Cited

U.S. PATENT DOCUMENTS

2020/0027171 A1* 1/2020 Oren ...................... G06Q 50/01
2021/0399911 A1* 12/2021 Jorasch ................ H04L 65/403

OTHER PUBLICATIONS

Gartner, 2020: Gartner Top 10 Strategic Predicitions for 2021 abd Beyond. (Available at https://www.gartner.com/smarterwithgartner/gartner-top-10-strategic-predictions-for-2021-and-beyond), 8 pages.
LinkedIn API Documentation, Authorization Code Flow (3-legged Oauth). (Available at https://learn.microsoft.com/en-us/linkedin/shared/authentication/authorization-code-flow?tabs=HTTPS1), 12 pages.
Salesforce, 2020: Announcement of Definitive Agreement to Acquire Slack. (Available at https://s23.q4cdn.com/574569502/files/doc_presentations/2020/Salesforce-Slack_Summary-Deck.pdf), 16 pages.

* cited by examiner

MULTIMODAL DATA FRAMEWORK FOR DIGITAL SYSTEM REPRESENTATION

TECHNICAL FIELD

The subject matter described herein relates generally to a data processing and more specifically to a multimodal data framework for the generation, enrichment, analysis, and storage of digital system representations.

BACKGROUND

Data processing may refer to the collection and/or manipulation of data including, for example, validation, sorting, summarization, aggregation, analysis, reporting, classification, and/or the like. However, traditional data processing applications may be inadequate for handling exceptionally voluminous and/or complex data sets known as "big data." Big data may be the product of common digital processes and social media exchange procedures taking place on nearly every mobile device, Internet-of-Things sensors, websites, and/or the like. Moreover, big data may require big data infrastructure with advanced capabilities to support the ingestion, cleansing, storage, analysis, sharing, transformation, and/or visualization of exceptionally voluminous and/or complex data sets.

SUMMARY

Systems, methods, and articles of manufacture, including computer program products, are provided for multi-dimensional digital system representations. In one aspect, there is provided a system. The system may include at least one data processor and at least one memory. The at least one memory may store instructions that cause operations when executed by the at least one data processor. The operations may include: collecting, from a first data source associated with a user, a first data including a browser history data and an application usage data; enriching the first data including by categorizing the browser history data categorized based on a type of website and the application usage data based on a type of application; and sending, to a data controller, the enriched first data to enable the data controller to generate a digital profile of the user, the digital profile including a plurality of dimensions, and each dimension of the plurality of dimensions being generated based on the first data and/or a second data collected from a second data source associated with the user.

In some variations, one or more features disclosed herein including the following features can optionally be included in any feasible combination. The enriching of the first data may further include determining a quantity of interactions with each category of website and determining a quantity of screen time associated with each type of application.

In some variations, the application usage data may be collected for a first application but not for a second application based at least on a respective permission status of the first application and the second application.

In some variations, the first data further may include a time-series data collected from a wearable device. The time-series data may correspond to one or more of a heart rate, a sleep pattern, and/or an activity level of the user.

In some variations, the operations may further include: collecting, from the second data source, the second data; enriching the second data; and sending, to the data controller, the enriched second data such that the digital profile of the user is generated based on at least one of the enriched first data and the enriched second data.

In some variations, the collecting and the enriching of the first data may be a part of a first pipeline. The collecting and the enriching of the second data may be a part of a second pipeline. The first pipeline and the second pipeline may be executed separately and at least partially in parallel with one another.

In some variations, the second data source may include one or more social media platforms, search engines, and content aggregators.

In some variations, the first data and/or the second data may include one or more of audio, video, and text associated with the user.

In some variations, the operations may further include: preprocessing at least a portion of the first data and/or the second data by at least performing a sentiment analysis to determine a type of sentiment, a fatigue level, an alertness level, and/or an engagement level exhibited by the user.

In some variations, the data controller may be further configured to analyze the digital profile and generate a recommendation corresponding to a burnout prediction, a wellness recommendation, a learning plan, a skill gap, and a personality type.

In another aspect, there is provided a method for multi-dimensional digital system representations. The method may include: collecting, from a first data source associated with a user, a first data including a browser history data and an application usage data; enriching the first data including by categorizing the browser history data categorized based on a type of website and the application usage data based on a type of application; and sending, to a data controller, the enriched first data to enable the data controller to generate a digital profile of the user, the digital profile including a plurality of dimensions, and each dimension of the plurality of dimensions being generated based on the first data and/or a second data collected from a second data source associated with the user.

In some variations, one or more features disclosed herein including the following features can optionally be included in any feasible combination. The enriching of the first data may further include determining a quantity of interactions with each category of website and determining a quantity of screen time associated with each type of application.

In some variations, the application usage data may be collected for a first application but not for a second application based at least on a respective permission status of the first application and the second application.

In some variations, the first data further may include a time-series data collected from a wearable device. The time-series data may correspond to one or more of a heart rate, a sleep pattern, and/or an activity level of the user.

In some variations, the method may further include: collecting, from the second data source, the second data; enriching the second data; and sending, to the data controller, the enriched second data such that the digital profile of the user is generated based on at least one of the enriched first data and the enriched second data.

In some variations, the collecting and the enriching of the first data may be a part of a first pipeline. The collecting and the enriching of the second data may be a part of a second pipeline. The first pipeline and the second pipeline may be executed separately and at least partially in parallel with one another.

In some variations, the first data and/or the second data may include one or more of audio, video, and text associated with the user.

In some variations, the method may further include: preprocessing at least a portion of the first data and/or the second data by at least performing a sentiment analysis to determine a type of sentiment, a fatigue level, an alertness level, and/or an engagement level exhibited by the user.

In some variations, the data controller may be further configured to analyze the digital profile and generate a recommendation corresponding to a burnout prediction, a wellness recommendation, a learning plan, a skill gap, and a personality type.

In another aspect, there is provided a computer program product that includes a non-transitory computer readable storage medium. The non-transitory computer-readable storage medium may include program code that causes operations when executed by at least one data processor. The operations may include: collecting, from a first data source associated with a user, a first data including a browser history data and an application usage data; enriching the first data including by categorizing the browser history data categorized based on a type of web site and the application usage data based on a type of application; and sending, to a data controller, the enriched first data to enable the data controller to generate a digital profile of the user, the digital profile including a plurality of dimensions, and each dimension of the plurality of dimensions being generated based on the first data and/or a second data collected from a second data source associated with the user.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a machine learning based performance prediction, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Optimal employee performance is crucial an organization's success. To maximize employee productivity, an organization may provide its employees with variety of enterprise software applications configured to support decision making and collaboration. However, conventional enterprise software applications are poorly integrated with employee data and thus lack the nuanced insights necessary to achieve individually customized workflows. As such, in some example embodiments, a multimodal data framework may be configured to support the generation, enrichment, analysis, and storage of a digital system representation for each employee. The digital system representation of an employee may integrate multimodal data corresponding to one or more of a work pattern, preference, routine, physical condition, and mental condition associated with the employee. Moreover, the digital system representation of the employee be used to implement one or more employee-specific customizations to a variety of enterprise software applications associated with the employee.

Figure 1:
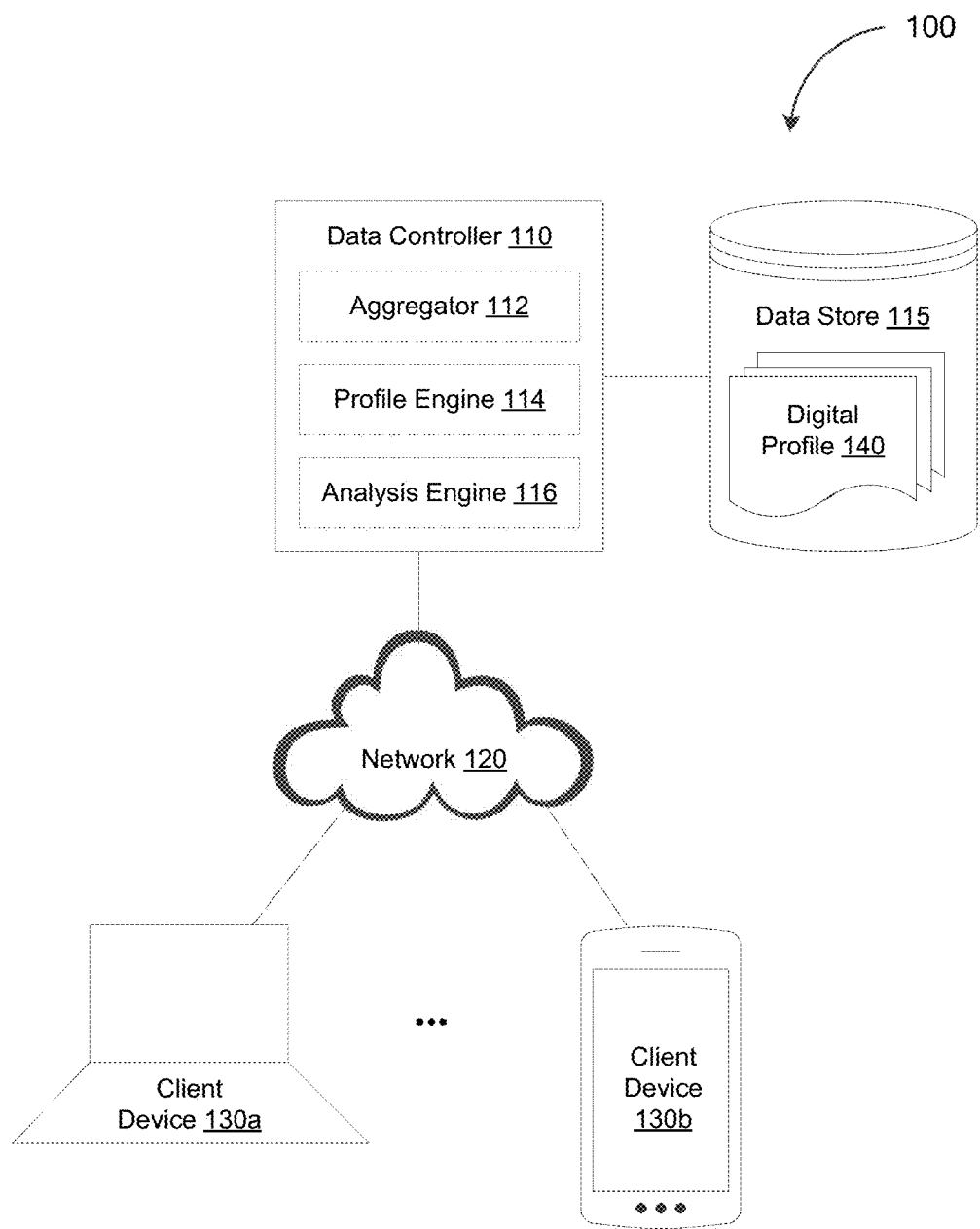
FIG. 1 depicts a system diagram illustrating an example of a multimodal data system, in accordance with some example embodiments.

FIG. 1 depicts a system diagram illustrating an example of a multimodal data system 100, in accordance with some example embodiments. As shown in FIG. 1, the multimodal data system 100 may include a data controller 110 that is communicatively coupled, via a network 120, to one or more client devices 130 including, for example, a first client device 130a, a second client device 130b, and/or the like. The network 120 may be any wired and/or wireless network including, for example, a public land mobile network (PLMN), a wide area network (WAN), a local area network (LAN), a virtual local area network (VLAN), the Internet, and/or the like. The one or more client devices 130 may be processor-based devices including, for example, smartphones, tablet computers, wearable apparatuses, virtual assistants, Internet-of-Things (IoT) appliances, and/or the like. In some cases, the one or more client devices 130 may be edge devices that provide an entry point into the local area network (LAN) or virtual local area network (VLAN) of an enterprise (or other organization).

In some example embodiments, the data controller 110 may include an aggregator 112 configured to identify one or more data sources associated with the user 135. For example, the one or more client devices 130 may be associated with multiple data sources spanning a variety of domains including, for example, a personal domain, a corporate domain, a public domain, and/or the like. Upon identifying the one or more data sources associated with the user 135, the aggregator 112 may aggregate, from the one or more client devices 130, a variety of data associated with a user 135. The data aggregated from the one or more client devices 130 may be multimodal data in a variety of formats including, for example, audio, video, text, and/or the like.

Figure 2A:
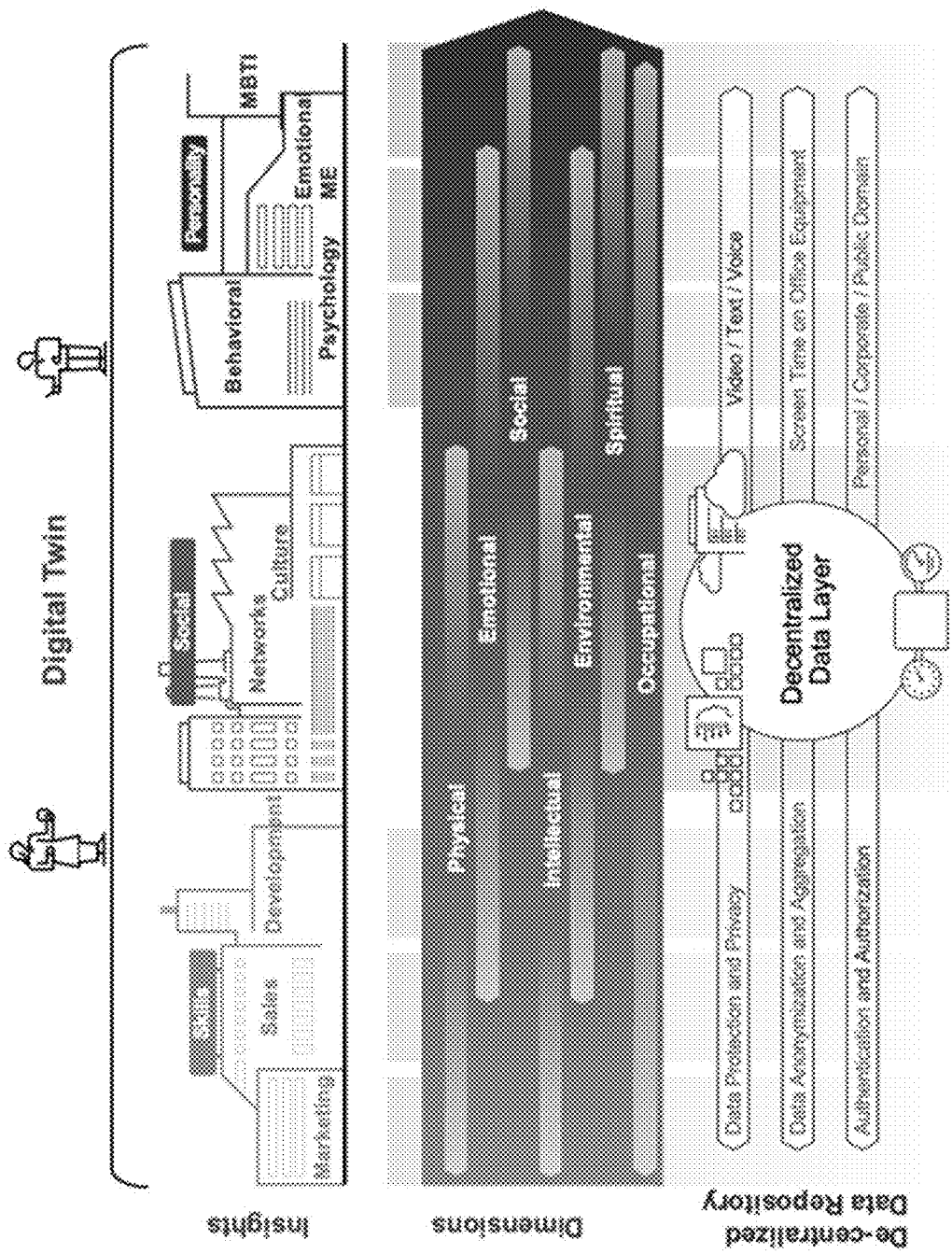
FIG. 2A depicts a schematic diagram illustrating an example of a multimodal data framework, in accordance with some example embodiments.

As shown in FIG. 2A, the aggregator 112 may maintain a decentralized data layer in which data remains at the source of the data (e.g., the one or more client devices 130) and ownership of the data remains with the creator. Any processing of the data may require consent from the owner of the data. Thus, in the case of data created by multiple parties, consent may be required from each party. For data in the public domain, processing and other manipulation of the data may be performed in accordance with the policy set forth by the public forums hosting the data. For example, the user 135 may generate content through a variety of activities including, for example, participating in a web conference call, conversing with a digital assistant, appearing in a video captured by a closed circuit television (CCTV) camera, and/or the like. The user 135 may generate data while interacting with the one or more client devices 130, in which case the data may belong in the personal domain of the user 135. Alternatively, the user 135 may generate data while interacting with other individuals from the same (or different) organization, in which case the data may belong to a corporate domain. Data that result from the user 135 interacting with a public forum (e.g., social media applications, blogs, and/or the like) may belong in the public domain. Whether in a personal domain, a corporate domain, or a public domain, the data may be in a variety of formats (e.g., audio, video, text, and/or the like) and include one or more facial expressions, body postures, vocal tones, diction, syntax, and/or the like.

Figure 2B:
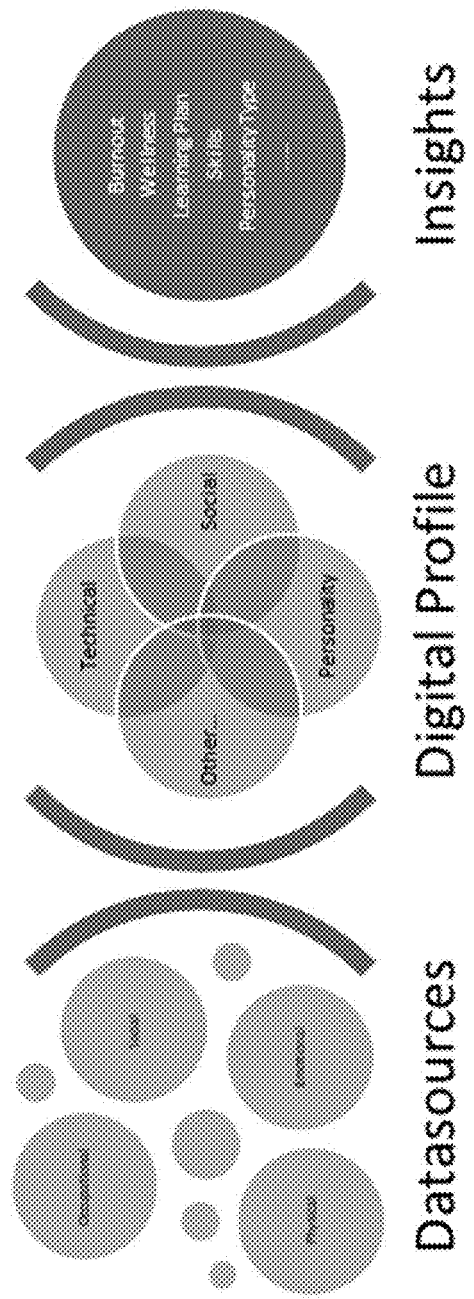
FIG. 2B depicts a schematic diagram illustrating an example of a multi-dimensional digital system representation, in accordance with some example embodiments.

In some example embodiments, the data controller 110 may include a profile engine 114 configured to generate, based on at least a portion of the data aggregated by the aggregator 112, a digital systems representation, such as a digital profile 140, of the user 135. As shown in FIG. 2B, the digital profile 140 may be multi-dimensional in that the digital profile 140 may include multiple aspects of the user 135 including, for example, social, emotional, spiritual, environmental, occupational, intellectual, physical, and/or the like. In some example embodiments, the data controller 110 may include an analysis engine 116 configured to generate, based at least on the digital profile 140 of the user 135, one or more insights that are consistent with the work patterns, preferences, routines, physical condition, and/or mental condition of the user 135. Examples of insights include burnout prediction, wellness recommendations, learning plans, skill gaps, personality types, and/or the like.

The analysis engine 116 may preprocess the data aggregated by the aggregator data 112 which, as noted, may include multimodal data in a variety of formats including, for example, audio, video, text, and/or the like. For example, text data, which may include transcribed speech data from audio data and/or video data, may undergo sentiment analysis to flag the text data as being associated with one or more positive sentiments, negative sentiments, or neutral sentiments. Audio data may be analyzed for the speed and tone of speech, which in turn may be used to determine a fatigue level, an alertness level, an engagement level, and/or other emotions exhibited by the user 135 associated with the audio data. Video data may be analyzed for physical indicators of fatigue, alertness, engagement, and/or other emotions such as happiness, excitement, fear, anger, and disgust. Examples of such indicators may include body posture, gait, and eye movement (e.g., pupil movement speed, pupil diameter, eyelid movement speed, eye open level, and/or the like). In some cases, video data may also be analyzed to determine one or more environmental conditions that the user 135 is exposed to.

Figure 3:
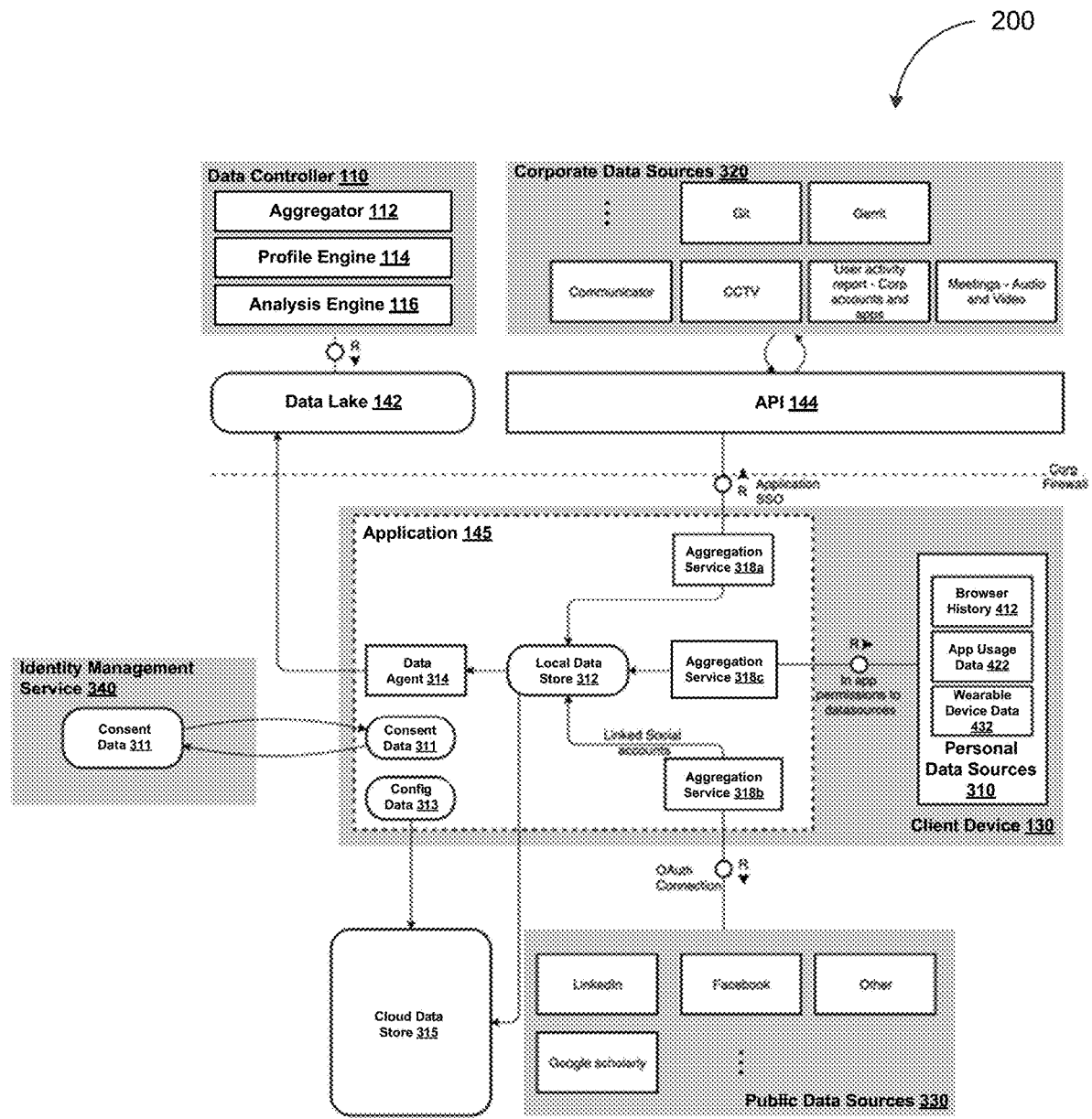
FIG. 3 depicts a block diagram illustrating an architecture of an example of a multimodal data system, in accordance with some example embodiments.

FIG. 3 depicts a block diagram illustrating an architecture of an example of the multimodal data system 100, in accordance with some example embodiments. Referring to FIG. 3, the data engine 110, for example, the aggregator 112, may aggregate data from one or more personal data sources 310, corporate data sources 320, and public data sources 330 through the client device 130. As shown in FIG. 3, examples of data aggregated from the one or more personal data sources 310 may include browser history, application usage, screen time, wearable device statistics, and keystrokes. The one or more public data sources 330 may include various social media platforms, search engines, and content aggregators. The data aggregated from the one or more corporate data sources 320 may include data owned by the user 135 such as audio and video recordings of meetings, messenger activities, closed-circuit television (CCTV) footage, and collaborative content. Alternatively and/or additionally, the data aggregated from the one or more corporate data sources 320 may include data owned by an organization associated with the user 135 including, for example, vacations, leaves, benefits, rewards and recognitions, and/or the like.

For collaborative content, the first aggregation service 318a may be linked to one or more collaboration platforms. The client device 130 and the user 135 may be authenticated in order for the first aggregation service 318a is able to access data from the one or more collaborative platforms. For example, in the case of a collaborative software development and version control application, the first aggregation service 318 may collect data corresponding to the coding pattern associated with the user 135 including, for example, the type of programming language, the quantity of time spent on each commit, the quantity of time spent resolving each issue, the size of each commit, coding frequency, and/or the like. Such data may contribute to the technical dimension of the digital profile 140 associated with the user 135.

Referring again to FIG. 3, the client device 130 may include an application 145 configured to aggregate data from the one or more personal data sources 310, corporate data sources 320, and public data sources 330. For example, the application 145 may include a first aggregation service 318a configured to collect, via an application programming interface (API) 144, data from the one or more corporate data sources 320. In cases where the access to the one or more corporate data sources 320 is controlled by a network security device (e.g., a firewall), the first aggregation service 318a may access the one or more corporate data sources 320 through an authentication tool such as a single sign-on (SSO) software. The application 145 may also include a second aggregation service 318b configured to collect, for example, through an open authorization (OAuth) connection, data from the one or more public data sources 330. Furthermore, the application 145 may include a third aggregation service 318c configured to collect data from the one or more personal data source 310. As shown in FIG. 3, the collection of data from the one or more personal data sources 310 may require one or more corresponding permissions.

As shown in FIG. 3, the data collected from the one or more personal data sources 310, corporate data sources 320, and public data sources 330 may be stored in a local data store 312. A data agent 314 may provide, to the data controller 110, the data collected from the one or more personal data sources 310, corporate data sources 320, and public data sources 330 by at least transferring the data from the local data store 312 to a data lake 142 accessible to the data controller 110. Processing of at least a portion of the data aggregated from the one or more personal data sources 310, corporate data sources 320, and public data sources 330 may require consent from the owners of the data. Accordingly, the application 145 may interact with an identity management service 340 (or another central consent repository (CCR)) to manage the consent data 311 associated with at least a portion of the data aggregated from the one or more personal data sources 310, corporate data sources 320, and public data sources 330. As shown in FIG. 3, at least a portion of the configuration data 313 associated with the application 145 may be stored in a cloud data store 315 instead of locally at the client device 130. To ensure compliance with data privacy regulations, the application 145 may track and record the use of at least some of the data aggregated from the one or more personal data sources 310, corporate data sources 320, and public data sources 330. Moreover, the application 145 may alert the user 135 when accessing the one or more personal data sources 310, corporate data sources 320, and public data sources 330, and processing any of the data aggregated therefrom. In some cases, the digital profile 140 may be generated on demand, for example, to perform an on-the-fly analysis, in which case the digital profile 140 and the data used to generate the digital profile 140 may be deleted as soon as the analysis is complete.

Figure 4A:
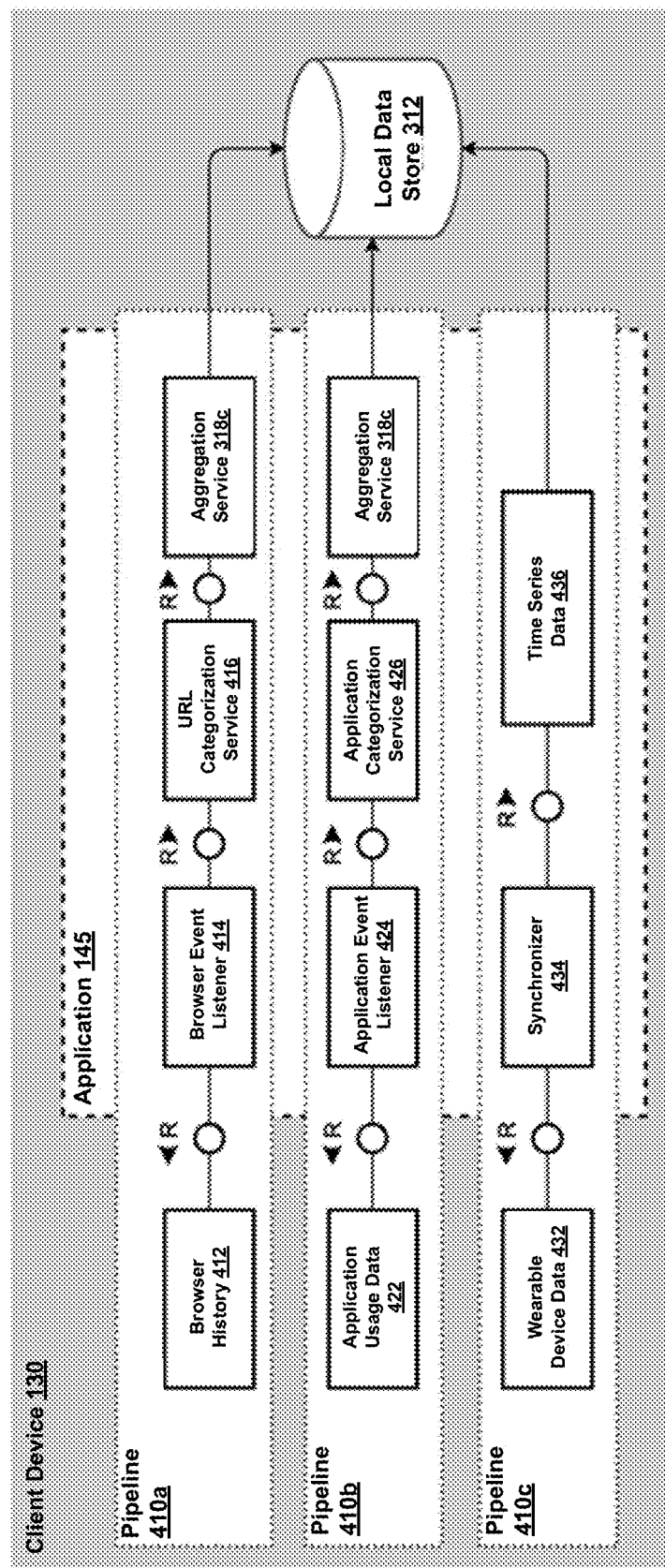
FIG. 4A depicts a block diagram illustrating an example of an edge device, in accordance with some example embodiments.

As shown in FIG. 4A, the client device 130 may include a separate pipeline for processing the data collected from the one or more personal data sources 310 including, for example, a first pipeline 410a for processing a browser history 412, a second pipeline 410b for processing an application usage data 422, and a third pipeline 410c for processing wearable device data 432. The first pipeline 410a, the second pipeline 410b, and the third pipeline 410c may be executed separately and at least partially in parallel with one another. FIG. 4A shows that the first pipeline 410a may include a browser event listener 414 and a uniform resource locator (URL) categorization service 416 for processing the browser history 412 associated, for example, with one or more Internet browsers at the client device 130. Table 1 below depicts examples of the browser history 412 in its raw form.

TABLE 1

| Timestamp | URL |
|---|---|
| (2021, 1, 20, 13, 45, 4), IST | https://stackoverflow.com/questions/152000121483/xyzasdf |
| (2021, 1, 20, 13, 51, 4), IST | https://google.com |

The browser event listener 414 may be configured to detect the addition of one or more new entries to the browser history 412 while the uniform resource locator categorization service 416 may be configured to assign each entry in the browser history 412 to a category in accordance with the corresponding uniform resource locator (URL). In doing so, the uniform resource locator categorization service 416 may generate the categorized browser history 412 shown in Table 2.

TABLE 2

| Timestamp | URL | URL Category | Category |
|---|---|---|---|
| (2021, 1, 20, 13, 45, 4), IST | https://stackoverflow.com/ . . . | Information Technology: Forums | Productivity |
| (2021, 1, 20, 13, 51, 4), IST | https://google.com | Search Engines & Portals | . . . |

The third data aggregation service 318c may be configured to aggregate the categorized browser history 412, including by enriching the categorized browser history 412 to reflect the quantity (or proportion) of interactions with each category of website, such that the browser history 412 may be used to generate the digital profile 140. Table 3 depicts an example of the aggregated browser history 412 generated by the third data aggregation service 318c. The aggregated browser history 412 may be stored in the local data store 312 from which at least a portion of the aggregated browser history 412 may be transferred to the data lake 142, for example, by the data agent 314. In some example embodiments, the data controller 110 may generate the digital profile 140 of the user 135 based at least on the aggregated browser history 412 retrieved from the data lake 142.

TABLE 3

| Category | Usage |
|---|---|
| Productivity | 53% |
| Learning & Education | 28% |
| Entertainment | . . . |
| Social | . . . |

Referring again to FIG. 4A, the second pipeline 410b for processing the application usage data 422 may include an application event listener 424 and an application categorization service 426. The application event listener 424 may be configured to detect when the user 135 launches an application at the client device 130 and log the quantity of screen time the user 135 spent interacting with the application. In some cases, the logging of screen time associated with the application may be consent based. As such, the application event listener 424 may, prior to tracking the screen time the user 135 spent interacting with the application, determine the corresponding in-application permission status. For example, the application event listener 424 may track the screen time associated with the application if the user 135 provided the corresponding permission but not if the user 135 did not provide the corresponding permission. The application categorization service 426 may assign, to each entry in the application usage data 422, a category in accordance with the corresponding type of application.

The third data aggregation service 318c may be configured to aggregate the categorized application usage data 422, including by enriching the categorized application usage data 422 to include the proportion of interactions with each category of applications. Table 4 depicts an example of the aggregated application usage data 422 generated by the third data aggregation service 318c. The aggregated application usage data 422 may be stored in the local data store 312 from which at least a portion of the aggregated application usage data 422 may be transferred to the data lake 142, for example, by the data agent 314. In some example embodiments, the digital profile 140 of the user 135 may be further generated based at least on the aggregated application usage data 422 retrieved from the data lake 142.

TABLE 4

| Category | Usage |
| --- | --- |
| Productivity | 53% |
| Finance | 13% |
| Entertainment | . . . |
| Social | . . . |

Figure 4B:
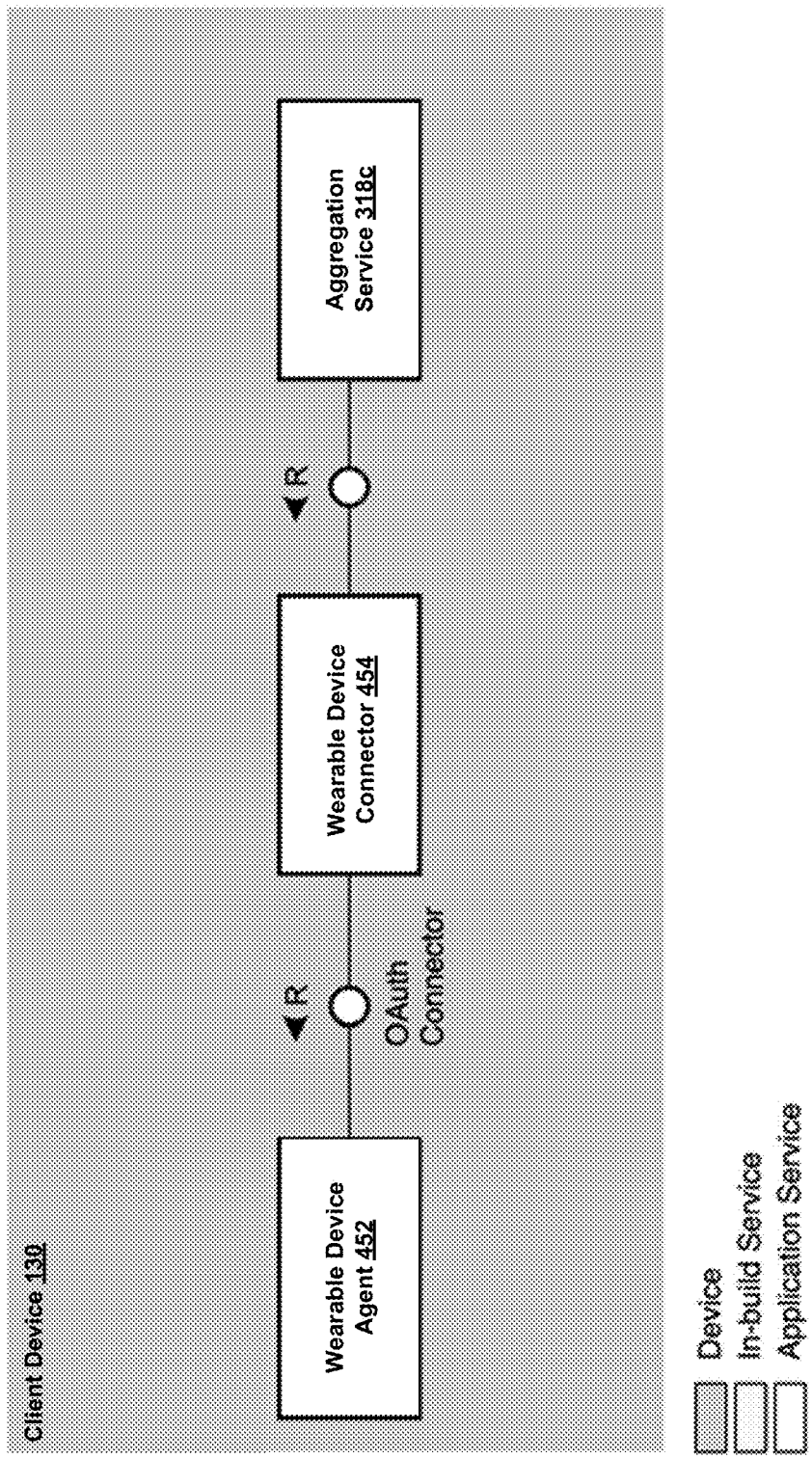
FIG. 4B depicts a block diagram illustrating another example of an edge device, in accordance with some example embodiments.
Figure 4C:
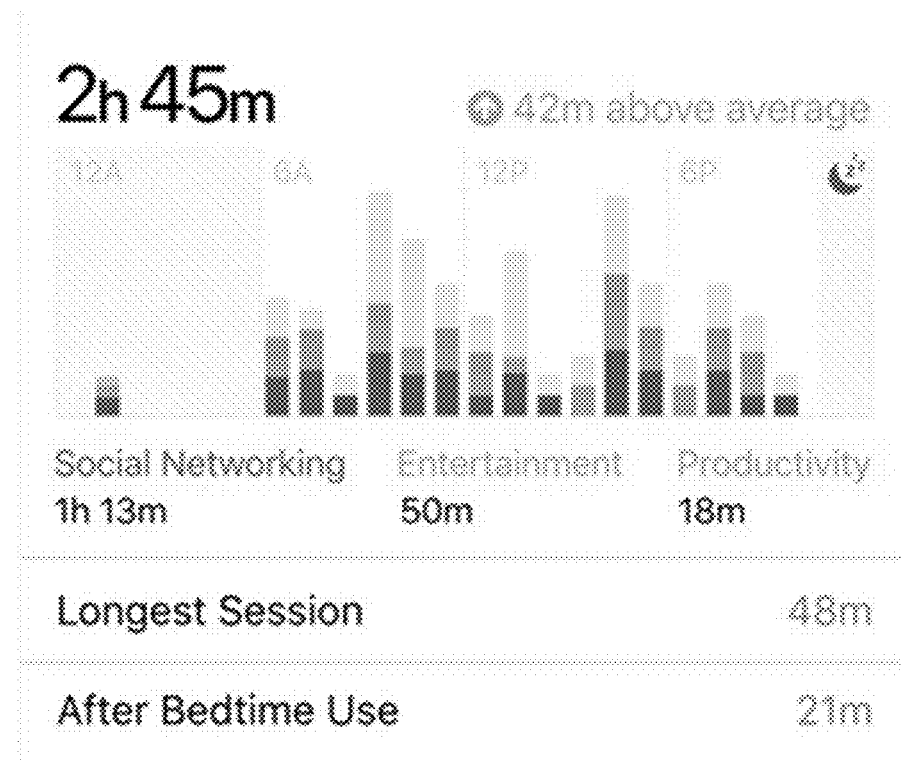
FIG. 4C depicts a screenshot illustrating an example of an application usage data displayed in a time series view, in accordance with some example embodiments.

In some cases, in addition to or instead of a breakdown of the usage across different categories of applications, the aggregated application usage data 422 may include time series data that reflect the usage of applications over different time periods. FIG. 4C FIG. 4C depicts a screenshot illustrating an example of the aggregated application usage data 422 displayed in a time series view in which the usage associated with different categories of applications is broken down across time of day.

In some example embodiments, the third pipeline 410c, which is configured to process the wearable device data 432, may include a synchronizer 434 configured to synchronize with one or more wearable devices of the user 135 on demand in order to collect time-series data 436 corresponding to a heart rate, a sleep pattern, and/or an activity level of the user 135. As shown in FIG. 4B, the client device 130 may include a wearable device agent 130 with which a wearable device connector 454 may establish a connection to a corresponding wearable device by performing an open authorization (OAuth) authentication. Upon establishing the connection with the wearable device, the third aggregation service 318c may access the time-series data 436 through one or more application programming interface (API) associated with the wearable device.

Figure 5A:
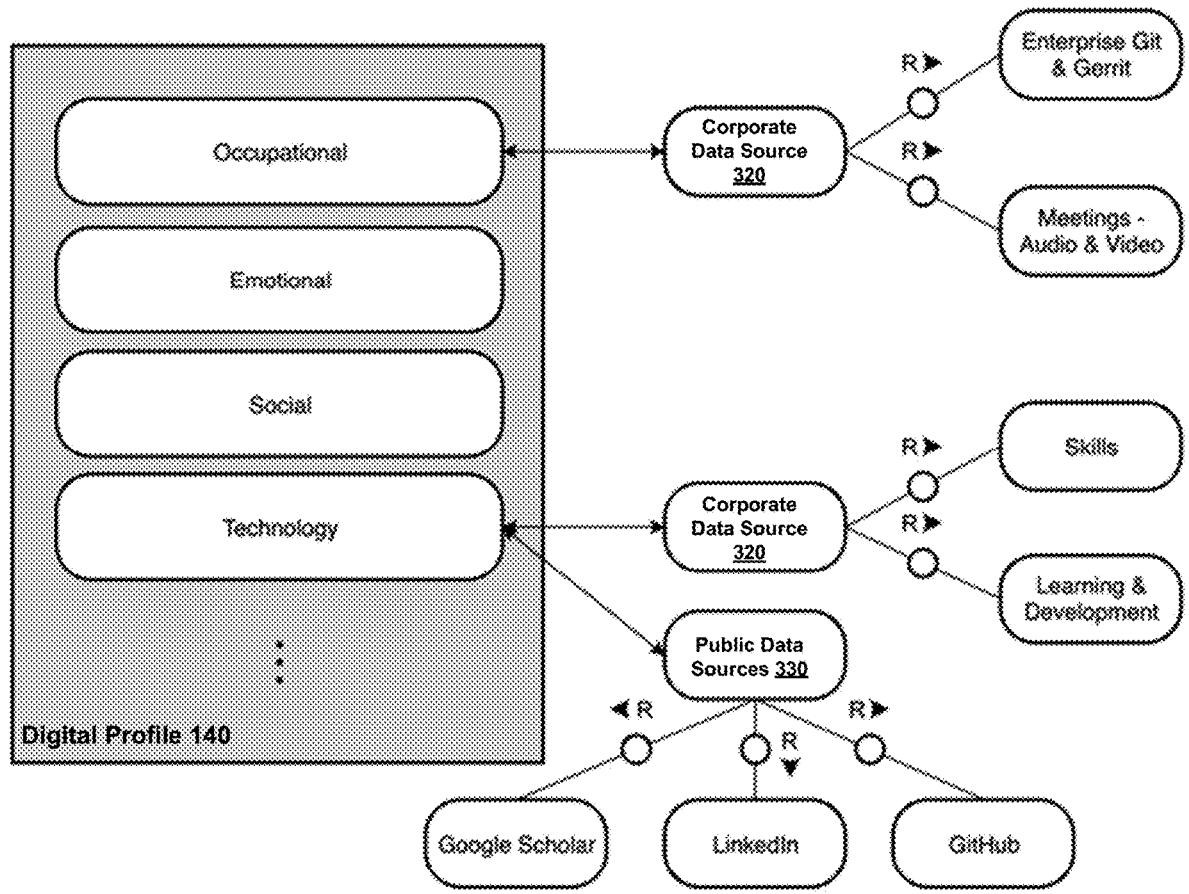
FIG. 5A depicts a schematic diagram illustrating another example of a multi-dimensional digital system representation, in accordance with some example embodiments.

FIG. 5A depicts a schematic diagram illustrating another example of the digital profile 140, in accordance with some example embodiments. As noted, the digital profile 140 may be multi-dimensional in that the digital profile 140 may include multiple aspects of the user 135 including, for example, social, emotional, spiritual, environmental, occupational, intellectual, physical, and/or the like. Moreover, the profile engine 114 may generate each dimension of the digital profile 140 based on data aggregated from a single data source or multiple data sources. For example, in the example shown in FIG. 5A, the occupational dimension of the digital profile 140 may be generated based on data aggregated from the one or more corporate data sources 320. Meanwhile, the technical dimension of the digital profile 140 may be generated based on data aggregated from the one or more corporate data sources 320 and public data sources 330.

Figure 5B:
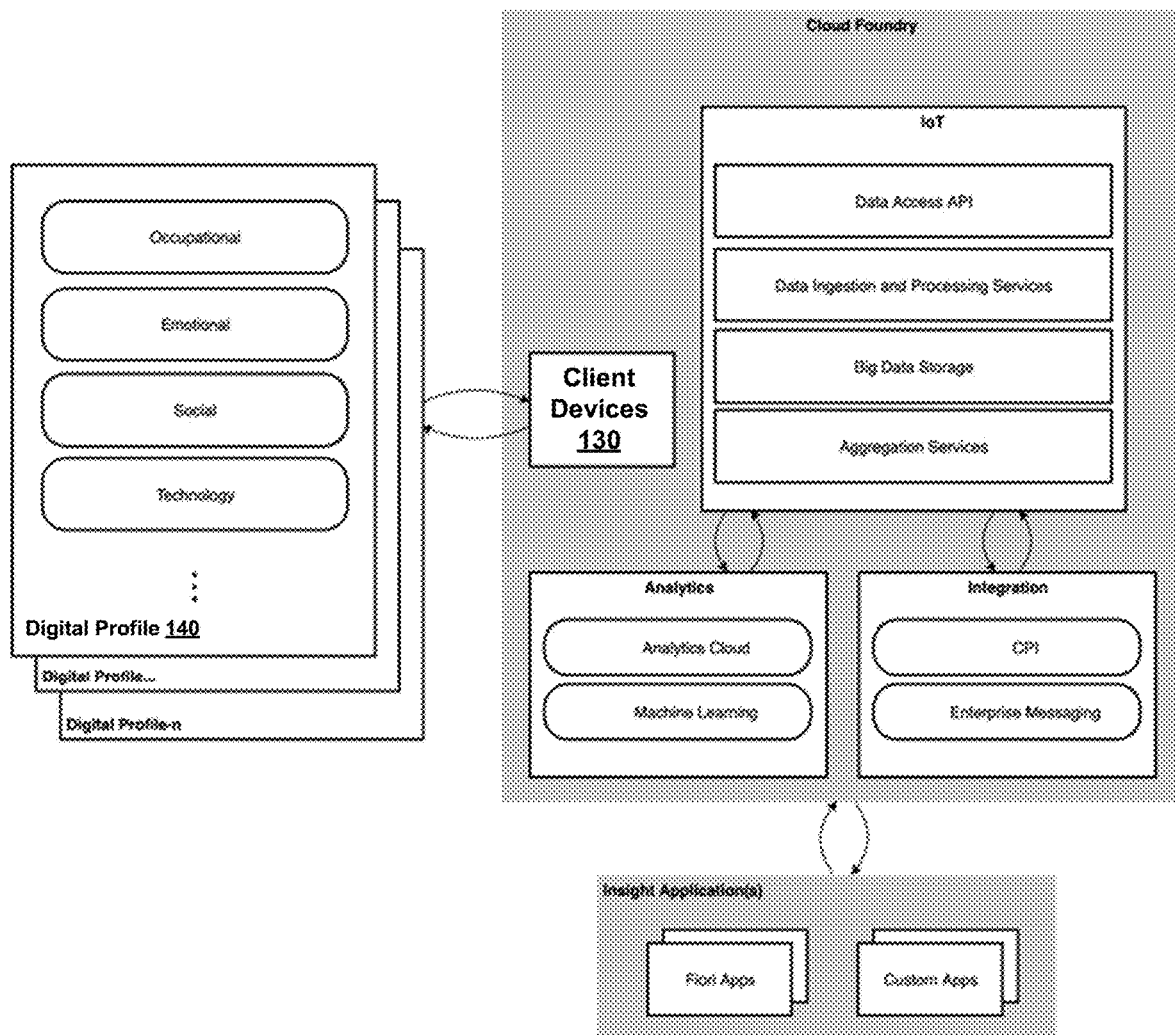
FIG. 5B depicts a schematic diagram illustrating an example of cloud-based processing for multi-dimensional digital system representations, in accordance with some example embodiments.

In some example embodiments, the analysis engine 116 may generate, based at least on the digital profile 140 of the user 135, one or more insights consistent with the work patterns, preferences, routines, physical condition, and/or mental condition of the user 135. Examples of insights include burnout prediction, wellness recommendations, learning plans, skill gaps, personality types, and/or the like. As shown in FIG. 5B, the data controller 110 may be integrated with a variety of enterprise software applications such that the insights generated by the analysis engine 116 may be used to create workflows that are individually customized for the user 135. In some cases, the insights generated by the analysis engine 116 may form the basis of one or more recommendations. For example, the analysis engine 116 may identify the user 135 as exhibiting one or more attributes required for a project or an open position within an organization. From the perspective of the user 135, the analysis engine 116 may identify the attributes of the user 135 and any gaps in skills and training. Alternatively and/or additionally, the analysis engine 116 may also authenticate the content of resumes and identify possible skill gaps and training gaps therein.

Figure 6A:
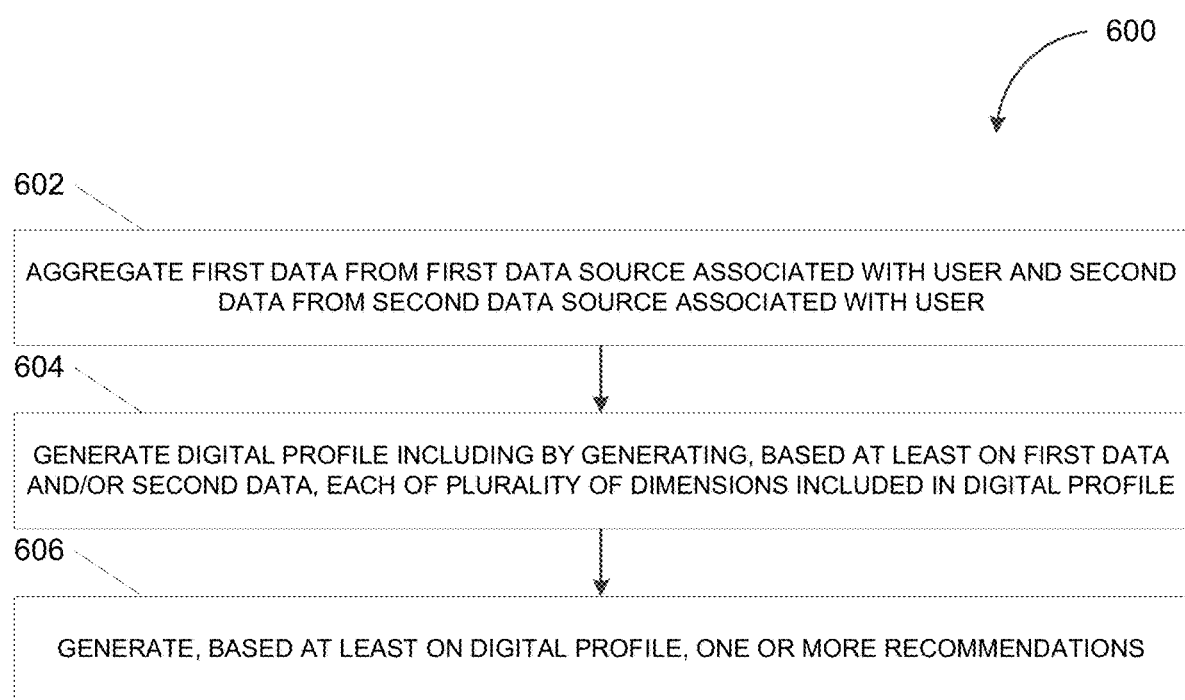
FIG. 6A depicts a flowchart illustrating an example of a process for multi-dimensional digital system representations, in accordance with some example embodiments.

FIG. 6A depicts a flowchart illustrating an example of a process 600 for multi-dimensional digital system representations, in accordance with some example embodiments. Referring to FIG. 6A, the process 600 may be performed by the data controller 110 to generate, enrich, and analyze the digital profile 140.

At 602, the data controller 110 may aggregate a first data from a first data source associated with a user and a second data from a second data source associated with the user. In some example embodiments, the aggregator 112 may aggregate data in a variety of format (e.g., audio, video, text, and/or the like) from multiple data sources including, for example, one or more personal data sources 310, corporate data sources 320, and public data sources 330 through the client device 130. As shown in FIG. 3, examples of data aggregated from the one or more personal data sources 310 may include the browser history 412, the application usage data 422, and the wearable device data 432. The one or more public data sources 330 may include various social media platforms, search engines, and content aggregators. The data aggregated from the one or more corporate data sources 320 may include data owned by the user 135 (e.g., audio and video recordings of meetings, messenger activities, closed-circuit television (CCTV) footage, collaborative content, and/or the like) and data owned by an organization associated with the user 135 (e.g., vacations, leaves, benefits, rewards and recognitions, and/or the like).

At 604, the data controller 110 may generate a digital profile including by generating, based at least on the first data and/or the second data, each of a plurality of dimensions included in the digital profile. In some example embodiments, the profile engine 114 may generate the digital profile 140 to be a multi-dimensional profile that includes multiple aspects of the user 135 including, for example, social, emotional, spiritual, environmental, occupational, intellectual, physical, and/or the like. Moreover, the profile engine 114 may generate each dimension of the digital profile 140 based on data aggregated from a single data source or multiple data sources. For example, in the example shown in FIG. 5A, the occupational dimension of the digital profile 140 may be generated based on data aggregated from the one or more corporate data sources 320 while the technical dimension of the digital profile 140 may be generated based on data aggregated from the one or more corporate data sources 320 and public data sources 330.

At 606, the data controller 110 may generate, based at least on the digital profile, one or more recommendations. In some example embodiments, the analysis engine 116 may generate, based at least on the digital profile 140 of the user 135, one or more insights consistent with the work patterns, preferences, routines, physical condition, and/or mental condition of the user 135. Examples of insights include burnout prediction, wellness recommendations, learning plans, skill gaps, personality types, and/or the like.

Figure 6B:
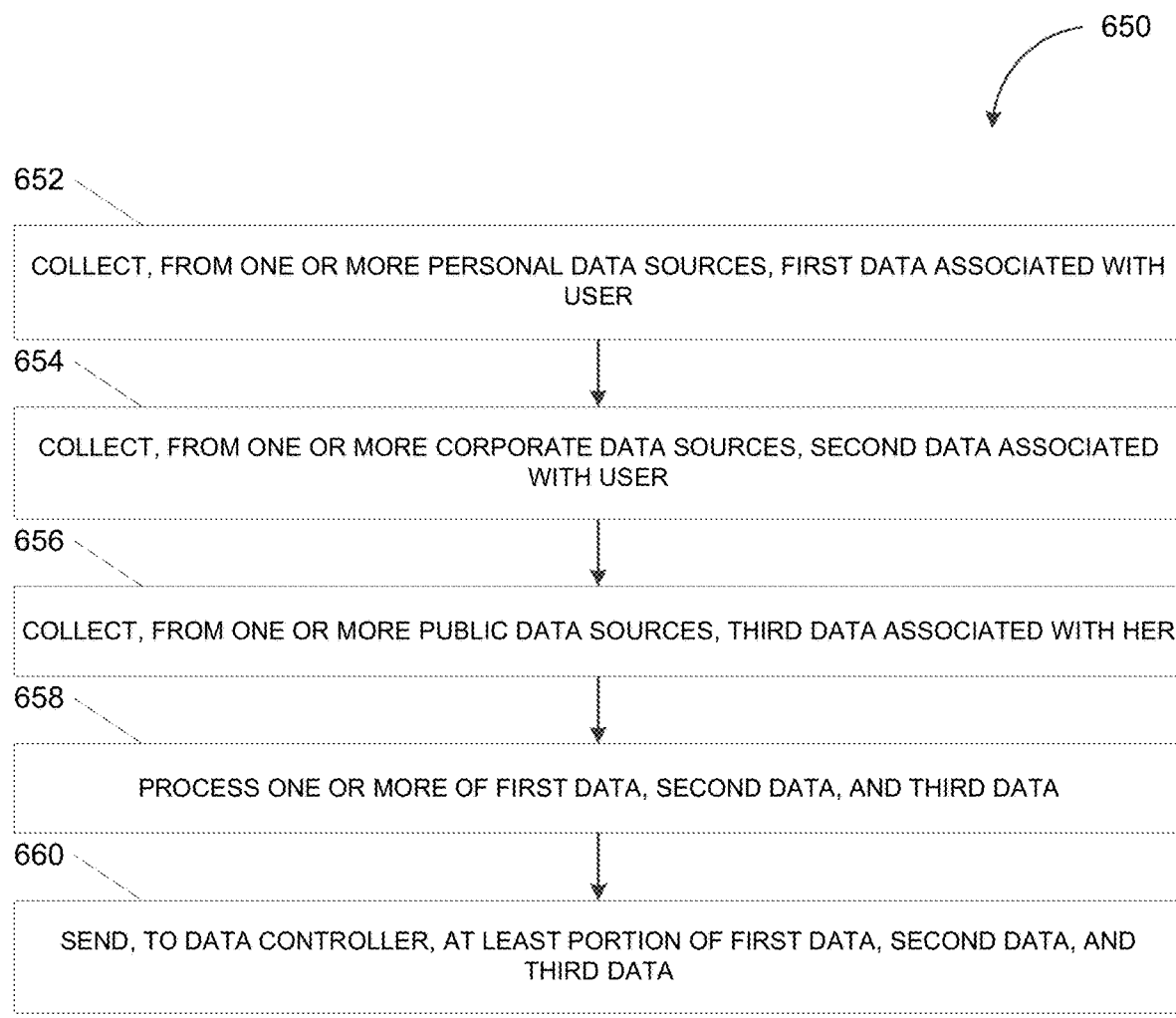
FIG. 6B depicts a flowchart illustrating another example of a process for multi-dimensional digital system representations, in accordance with some example embodiments.

FIG. 6B depicts a flowchart illustrating an example of a process 650 for multi-dimensional digital system representations, in accordance with some example embodiments. Referring to FIG. 6B, the process 650 may be performed by the client device 110, for example, the application 145, to aggregate data associated with the user 135.

At 652, the client device 130 may collect, from one or more personal data sources, a first data associated with a user. In some example embodiments, the application 145 may include the first pipeline 410a in which the browser event listener 414 detects the addition of one or more new entries to the browser history 412.

At 654, the client device 130 may collect, from one or more corporate data sources, a second data associated with the user. In some example embodiments, the application 145 may include the second pipeline 410b in which the application event listener 424 detects when the user 135 launches an application at the client device 130 and logs the quantity of screen time the user 135 spent interacting with the application. In some cases, the logging of screen time associated with the application may be consent based. As such, the application event listener 424 may, prior to tracking the screen time the user 135 spent interacting with the application, determine the corresponding in-application permission status.

At 656, the client device 130 may collect, from one or more public data sources, a third data associated with the user. In some example embodiments, the application 145 may include the third pipeline 410c in which the synchronizer 434 synchronizes with one or more wearable devices of the user 135 on demand in order to collect the time-series data 436 corresponding to a heart rate, a sleep pattern, and/or an activity level of the user 135.

At 658, the client device 130 may enrich one or more of the first data, the second data, and the third data. In some example embodiments, the application 145 may categorize and/or aggregate at least a portion of the data aggregated from the one or more personal data sources 310, corporate data sources 320, and public data sources 330. For example, the first pipeline 410a may include the uniform resource locator categorization service 416, which may be configured to assign each entry in the browser history 412 to a category in accordance with the corresponding uniform resource locator (URL). Moreover, the third aggregation service 318c may aggregate the categorized browser history 412, for example, by enriching the categorized browser history 412 to reflect the proportion of interactions with each category of websites. The second pipeline 410b may include the application categorization service 426, which may assign, to each entry in the application usage data 422, a category in accordance with the corresponding type of application. The third aggregation service 318c may aggregate the categorized application usage data 422 including by enriching the categorized application usage data 422 to include the proportion of interactions with each category of applications.

At 660, the client device 130 may send, to the data controller 110, at least a portion of the first data, the second data, and the third data. For example, in the example shown in FIG. 3, the first aggregation service 318a may aggregate data from the one or more corporate data sources 320, the second aggregation service 318b may aggregate data from the one or more public data sources 330, and the third aggregation service 318c may aggregate data from the one or more personal data sources 310. The data aggregated from the one or more personal data sources 310, corporate data sources 320, and public data sources 330 may be stored in the local data store 312 at the client device 130. To render the data accessible to the data controller 110, the data agent 314 may transfer, to the data lake 142, at least a portion of the data aggregated from the one or more personal data sources 310, corporate data sources 320, and public data sources 330. Accordingly, in order to generate and analyze the digital profile 140 of the user 135, the data controller 110 may access the data lake 142 to retrieve at least a portion of the data associated with the user 135. In cases where the digital profile 140 is generated on demand, for example, to perform an on-the-fly analysis, the digital profile 140 and the data used to generate the digital profile 140 may be deleted as soon as the analysis is complete.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: collecting, from a first data source associated with a user, a first data including a browser history data and an application usage data; enriching the first data including by categorizing the browser history data categorized based on a type of website and the application usage data based on a type of application; and sending, to a data controller, the enriched first data to enable the data controller to generate a digital profile of the user, the digital profile including a plurality of dimensions, and each dimension of the plurality of dimensions being generated based on the first data and/or a second data collected from a second data source associated with the user.

Example 2: The system of example 1, wherein the enriching of the first data further includes determining a quantity of interactions with each category of web site and determining a quantity of screen time associated with each type of application.

Example 3: The system of any one of examples 1-2, wherein the application usage data is collected for a first application but not for a second application based at least on a respective permission status of the first application and the second application.

Example 4: The system of any one of examples 1-3, wherein the first data further includes a time-series data collected from a wearable device, and wherein the time-series data corresponds to one or more of a heart rate, a sleep pattern, and/or an activity level of the user.

Example 5: The system of any one of examples 1-4, wherein the operations further include: collecting, from the second data source, the second data; enriching the second data; and sending, to the data controller, the enriched second data such that the digital profile of the user is generated based on at least one of the enriched first data and the enriched second data.

Example 6: The system of example 5, wherein the collecting and the enriching of the first data are a part of a first pipeline, wherein the collecting and the enriching of the second data are a part of a second pipeline, and wherein the first pipeline and the second pipeline are executed separately and at least partially in parallel with one another.

Example 7: The system of any one of examples 1-6, wherein the second data source includes one or more social media platforms, search engines, and content aggregators.

Example 8: The system of any one of examples 1-7, wherein the first data and/or the second data include one or more of audio, video, and text associated with the user.

Example 9: The system of example 8, wherein the operations further include: preprocessing at least a portion of the first data and/or the second data by at least performing a sentiment analysis to determine a type of sentiment, a fatigue level, an alertness level, and/or an engagement level exhibited by the user.

Example 10: The system of any one of examples 1-9, wherein the data controller is further configured to analyze the digital profile and generate a recommendation corresponding to a burnout prediction, a wellness recommendation, a learning plan, a skill gap, and a personality type.

Example 10: A method, comprising: collecting, from a first data source associated with a user, a first data including a browser history data and an application usage data; enriching the first data including by categorizing the browser history data categorized based on a type of website and the application usage data based on a type of application; and sending, to a data controller, the enriched first data to enable the data controller to generate a digital profile of the user, the digital profile including a plurality of dimensions, and each dimension of the plurality of dimensions being generated based on the first data and/or a second data collected from a second data source associated with the user.

Example 12: The method of example 11, wherein the enriching of the first data further includes determining a quantity of interactions with each category of website and determining a quantity of screen time associated with each type of application.

Example 13: The method of any one of examples 11-12, wherein the application usage data is collected for a first application but not for a second application based at least on a respective permission status of the first application and the second application.

Example 14: The method of any one of examples 11-13, wherein the first data further includes a time-series data collected from a wearable device, and wherein the time-series data corresponds to one or more of a heart rate, a sleep pattern, and/or an activity level of the user.

Example 15: The method of any one of examples 11-14, further comprising: collecting, from the second data source, the second data; enriching the second data; and sending, to the data controller, the enriched second data such that the digital profile of the user is generated based on at least one of the enriched first data and the enriched second data.

Example 16: The method of example 15, wherein the collecting and the enriching of the first data are a part of a first pipeline, wherein the collecting and the enriching of the second data are a part of a second pipeline, and wherein the first pipeline and the second pipeline are executed separately and at least partially in parallel with one another.

Example 17: The method of any one of examples 11-16, wherein the first data and/or the second data include one or more of audio, video, and text associated with the user.

Example 18: The method of example 17, further comprising: preprocessing at least a portion of the first data and/or the second data by at least performing a sentiment analysis to determine a type of sentiment, a fatigue level, an alertness level, and/or an engagement level exhibited by the user.

Example 19: The method of any one of examples 11-18, wherein the data controller is further configured to analyze the digital profile and generate a recommendation corresponding to a burnout prediction, a wellness recommendation, a learning plan, a skill gap, and a personality type.

Example 20: A non-transitory computer readable medium storing instructions, which when executed by at least one data processor, result in operations comprising: collecting, from a first data source associated with a user, a first data including a browser history data and an application usage data; enriching the first data including by categorizing the browser history data categorized based on a type of website and the application usage data based on a type of application; and sending, to a data controller, the enriched first data to enable the data controller to generate a digital profile of the user, the digital profile including a plurality of dimensions, and each dimension of the plurality of dimensions being generated based on the first data and/or a second data collected from a second data source associated with the user.

Figure 7:
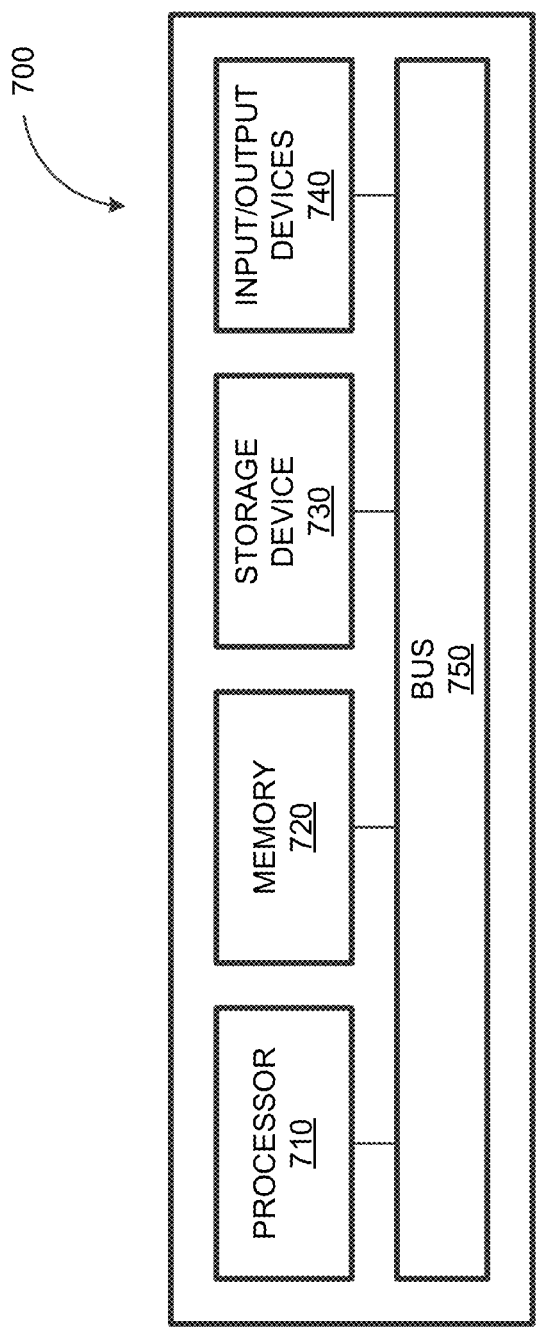
FIG. 7 depicts a block diagram illustrating an example of a computing system, in accordance with some example embodiments.

FIG. 7 depicts a block diagram illustrating a computing system 700, in accordance with some example embodiments. Referring to FIGS. 1-7, the computing system 700 can be used to implement the data controller 110, the one or more client devices 130, and/or any components therein.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the data controller 110, the one or more client devices 130, and/or the like. In some example embodiments, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some example embodiments, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some example embodiments, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, for example, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:
1. A system, comprising:
at least one data processor; and at least one memory storing instructions, which when executed by the at least one data processor, result in operations comprising:

retrieving, from a plurality of data sources, multimodal data, the plurality of data sources comprising a wearable device worn by a user and a camera recording an action of the user, the multimodal data comprising a browser history data, an application usage data, time-series data generated by any of the wearable device and the camera, and a coding pattern associated with one or more collaborative platforms, the time-series data corresponding to one or more of a heart rate, a sleep pattern, and an activity level of the user, the coding pattern comprising one or more of a type of programming language, a first quantity of time spent on each commit, a second quantity of time spent resolving each issue, a size of each commit, and a coding frequency;

categorizing the browser history data based on a type of website to determine a website interaction quantity for the respective type of website;

categorizing the application usage data based on a type of application to determine a screen time quantity associated with the respective type of application;

generating enriched multimodal data by updating the multimodal data to comprise the website interaction quantity and the screen time quantity;

generating, by a data controller, a digital profile of the user comprising a plurality of dimensions, and each dimension of the plurality of dimensions being generated based on the enriched multimodal data associated with the user, the plurality of dimensions comprising a technical dimension associated with the coding pattern and a wellbeing dimension associated with the website interaction quantity and the screen time quantity; and providing a recommendation to be displayed, the recommendation being based on an analysis of a change in the technical dimension relative to the wellbeing dimension of the digital profile of the user.

2. The system of claim 1, wherein the application usage data is collected for a first application but not for a second application based at least on a respective permission status of the first application and the second application.

3. The system of claim 1, wherein the multimodal data comprises a first data generated by a first data source and a second data generated by a second data source.

4. The system of claim 3, wherein enriching of the first data is a part of a first pipeline, wherein enriching of the second data is a part of a second pipeline, and wherein the first pipeline and the second pipeline are executed separately and at least partially in parallel with one another.

5. The system of claim 1, wherein the plurality of data sources comprise one or more social media platforms, search engines, and content aggregators.

6. The system of claim 1, wherein the multimodal data comprises one or more of audio, video, and text associated with the user.

7. The system of claim 1, wherein the operations further comprise:

preprocessing at least a portion of the multimodal data by at least performing a sentiment analysis to determine a type of sentiment, a fatigue level, an alertness level, and/or an engagement level exhibited by the user.

8. The system of claim 1, wherein the recommendation is corresponding to a burnout prediction, a wellness recommendation, a learning plan, a skill gap, and a personality type.

9. A computer-implemented method, comprising:

retrieving, from a plurality of data sources, multimodal data, the plurality of data sources comprising a wearable device worn by a user and a camera recording an action of the user, the multimodal data comprising a browser history data, an application usage data, time-series data generated by any of the wearable device and the camera, and a coding pattern associated with one or more collaborative platforms, the time-series data corresponding to one or more of a heart rate, a sleep pattern, and an activity level of the user, the coding pattern comprising one or more of a type of programming language, a first quantity of time spent on each commit, a second quantity of time spent resolving each issue, a size of each commit, and a coding frequency;

categorizing the browser history data based on a type of website to determine a website interaction quantity for the respective type of website;

categorizing the application usage data based on a type of application to determine a screen time quantity associated with the respective type of application;

generating enriched multimodal data by updating the multimodal data to comprise the website interaction quantity and the screen time quantity;

generating, by a data controller, a digital profile of the user comprising a plurality of dimensions, and each dimension of the plurality of dimensions being generated based on the enriched multimodal data associated with the user, the plurality of dimensions comprising a technical dimension associated with the coding pattern and a wellbeing dimension associated with the website interaction quantity and the screen time quantity; and providing a recommendation to be displayed, the recommendation being based on an analysis of a change in the technical dimension relative to the wellbeing dimension of the digital profile of the user.

10. The computer-implemented method of claim 9, wherein the application usage data is collected for a first application but not from a second application based at least on a respective permission status of the first application and the second application.

11. The computer-implemented method of claim 9, wherein the multimodal data includes a first data generated by a first data source and a second data generated by a second data source.

12. The computer-implemented method of claim 11, wherein enriching of the first data is a part of a first pipeline, wherein enriching of the second data is a part of a second pipeline, and wherein the first pipeline and the second pipeline are executed separately and at least partially in parallel with one another.

13. The computer-implemented method of claim 9, wherein the multimodal data includes one or more of audio, video, and text associated with the user.

14. The computer-implemented method of claim 13, further comprising:

preprocessing at least a portion of the multimodal data by at least performing a sentiment analysis to determine a type of sentiment, a fatigue level, an alertness level, and/or an engagement level exhibited by the user.

15. The computer-implemented method of claim 9, wherein the data controller is further configured to analyze the digital profile and generate a recommendation corresponding to a burnout prediction, a wellness recommendation, a learning plan, a skill gap, and a personality type.

16. A non-transitory computer readable medium storing instructions, which when executed by at least one data processor, result in operations comprising:

retrieving, from a plurality of data sources, multimodal data, the plurality of data sources comprising a wearable device worn by a user and a camera recording an action of the user, the multimodal data comprising a browser history data, an application usage data, time-series data generated by any of the wearable device and the camera, and a coding pattern associated with one or more collaborative platforms, the time-series data corresponding to one or more of a heart rate, a sleep pattern, and an activity level of the user, the coding pattern comprising one or more of a type of programming language, a first quantity of time spent on each commit, a second quantity of time spent resolving each issue, a size of each commit, and a coding frequency;

categorizing the browser history data based on a type of website to determine a website interaction quantity for the respective type of website;

categorizing the application usage data based on a type of application to determine a screen time quantity associated with the respective type of application;

generating enriched multimodal data by updating the multimodal data to comprise the website interaction quantity and the screen time quantity;

generating, by a data controller, a digital profile of the user comprising a plurality of dimensions, and each dimension of the plurality of dimensions being generated based on the enriched multimodal data associated with the user, the plurality of dimensions comprising a technical dimension associated with the coding pattern and a wellbeing dimension associated with the website interaction quantity and the screen time quantity; and providing a recommendation to be displayed, the recommendation being based on an analysis of a change in the technical dimension relative to the wellbeing dimension of the digital profile of the user.

\* \* \* \* \*